United States Patent
Prakash et al.

(10) Patent No.: US 8,027,302 B2
(45) Date of Patent: Sep. 27, 2011

(54) METHOD AND APPARATUS FOR TRANSMITTING AND RECEIVING SELECTED INTERLACE ACKNOWLEDGEMENT MESSAGES IN WIRELESS COMMUNICATION SYSTEMS

(75) Inventors: Rajat Prakash, San Diego, CA (US); Aamod Khandekar, San Diego, CA (US); Alexei Gorokhov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 12/091,445

(22) PCT Filed: Oct. 27, 2006

(86) PCT No.: PCT/US2006/042112
§ 371 (c)(1),
(2), (4) Date: Oct. 13, 2008

(87) PCT Pub. No.: WO2007/050957
PCT Pub. Date: May 3, 2007

(65) Prior Publication Data
US 2009/0147802 A1    Jun. 11, 2009

Related U.S. Application Data

(60) Provisional application No. 60/731,126, filed on Oct. 27, 2005.

(51) Int. Cl.
*H04J 11/00* (2006.01)
*H04W 4/00* (2009.01)
(52) U.S. Cl. .................................. 370/330; 370/208
(58) Field of Classification Search .................. 370/203, 370/208
See application file for complete search history.

(56) References Cited

U.S. PATENT DOCUMENTS

| | | | | |
|---|---|---|---|---|
| 6,366,779 | B1 * | 4/2002 | Bender et al. | 455/450 |
| 2005/0063298 | A1 * | 3/2005 | Ling et al. | 370/208 |
| 2005/0135308 | A1 * | 6/2005 | Vijayan et al. | 370/330 |
| 2005/0249181 | A1 * | 11/2005 | Vijayan et al. | 370/344 |
| 2006/0280160 | A1 * | 12/2006 | Padovani et al. | 370/347 |

FOREIGN PATENT DOCUMENTS
EP    1158685 A1    11/2001
(Continued)

OTHER PUBLICATIONS

Tomcik J et al: "QFDD and QTDD: Proposed Draft Air Interface Specification, chapter 6, Lower MAC Control Sublayer; pp. I-XXXI and 6-1-6-118" IEEE C802.20-05/69, Oct. 28, 2005.
Qualcomm: "UHDR-One Connection Layer: Registration, Paging and Misc. Features" 3GPP2, [Online] Aug. 25, 2006, pp. 1-17.
Office Action mailed Feb. 23, 2010 for Korean Patent Application No. 2008-7012570, 4 pages.

(Continued)

*Primary Examiner* — Ricky Ngo
*Assistant Examiner* — Paul Masur
(74) *Attorney, Agent, or Firm* — Turocy & Watson, LLP

(57) ABSTRACT

An apparatus and method of acknowledging transition to SelectedInterlacesOff state in a wireless communication system are described. A SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" is generated and transmitted over a communication link.

7 Claims, 8 Drawing Sheets

FOREIGN PATENT DOCUMENTS

| | | |
|---|---|---|
| KR | 2004-7214 | 1/2004 |
| WO | 0176279 A2 | 10/2001 |
| WO | 2005041515 A | 5/2005 |

OTHER PUBLICATIONS

International Search Report and Written Opinion mailed May 3, 2007 for PCT Application No. PCT/US2006/042112, 15 pages.

* cited by examiner

METHOD AND APPARATUS FOR TRANSMITTING AND RECEIVING SELECTED INTERLACE ACKNOWLEDGEMENT MESSAGES IN WIRELESS COMMUNICATION SYSTEMS

CLAIM OF PRIORITY UNDER 35 U.S.C. §119

The present application for patent claims priority to Provisional Application Ser. No. 60/731,126 entitled "METHODS AND APPARATUS FOR PROVIDING MOBILE BROADBAND WIRELESS LOWER MAC", filed Oct. 27, 2005, assigned to the assignee hereof, and expressly incorporated herein by reference.

BACKGROUND

1. Field

The present disclosure relates generally to wireless communications, and more particularly to methods and apparatus for transmitting and receiving selected interlace acknowledgment messages.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

According to an embodiment, a method is provided for acknowledging transition to SelectedInterlacesOff state in a wireless communication system, the method comprising generating a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace: mode enabled and to "0" otherwise and a 3 bit Reserved field wherein the Reserved field is of such length so that the entire message is octet-aligned and is set to "0" and transmitting the SelectedInterlaceAck message over a communication link.

According to another embodiment, an apparatus operable in a wireless communication system is described which includes means for generating a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and transmitting the SelectedInterlaceAck message over a communication link.

According to yet another embodiment, a computer readable medium is described having a first set of instructions for generating a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and a second set of instructions for transmitting the SelectedInterlaceAck message over a communication link.

According to yet another embodiment, a computer readable medium is described having a first set of instructions for receiving a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and a second set of instructions for processing the SelectedInterlaceAck message over a communication link.

According to yet another embodiment, a method is provided for receiving information in a wireless communication system, the method comprising receiving a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field, wherein the Reserved field is of such length so that the entire message is octet-aligned and is set to "0" and processing the SelectedInterlaceAck message over a communication link.

According to yet another embodiment, an apparatus operable in a wireless communication system is described which includes means for receiving a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and means for processing the SelectedInterlaceAck message.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
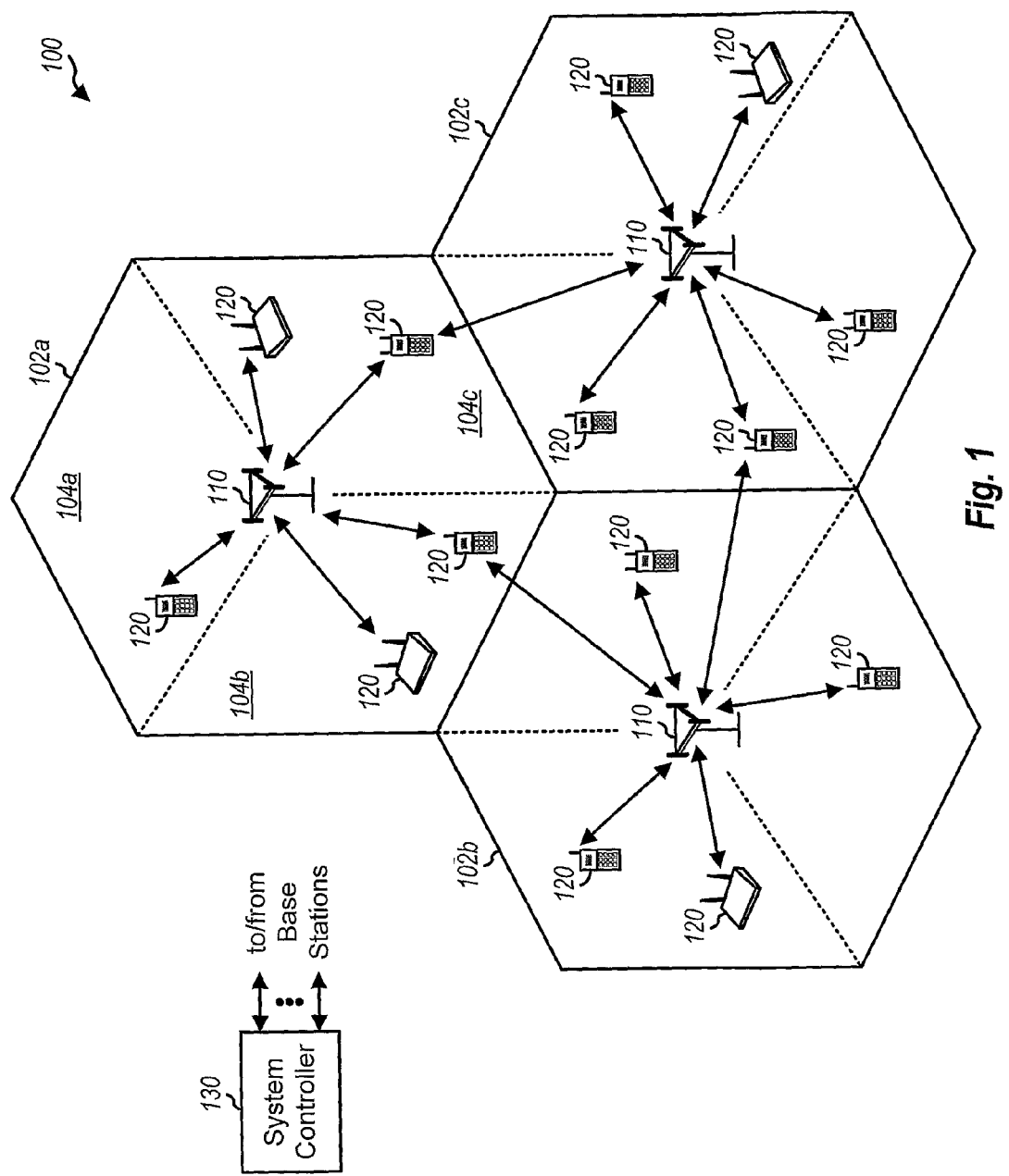
FIG. 1 illustrates embodiments of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one embodiment is illustrated. A multiple access wireless communication system 100 includes multiple cells, e.g. cells 102a, 102b and 102c. In the embodiment of FIG. 1, each cell 102a, 102b and 102c may include an access point that includes multiple sectors, such as sectors 104a, 104b, and 104c in cell 102a. The multiple sectors are formed by groups of antennas 110 each responsible for communication with access terminals 120 in a portion of the cell.

Each cell includes several access terminals which are in communication with one or more sectors of each access point.

Controller 130 is coupled to each of the cells 102a, 102b and 102c. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
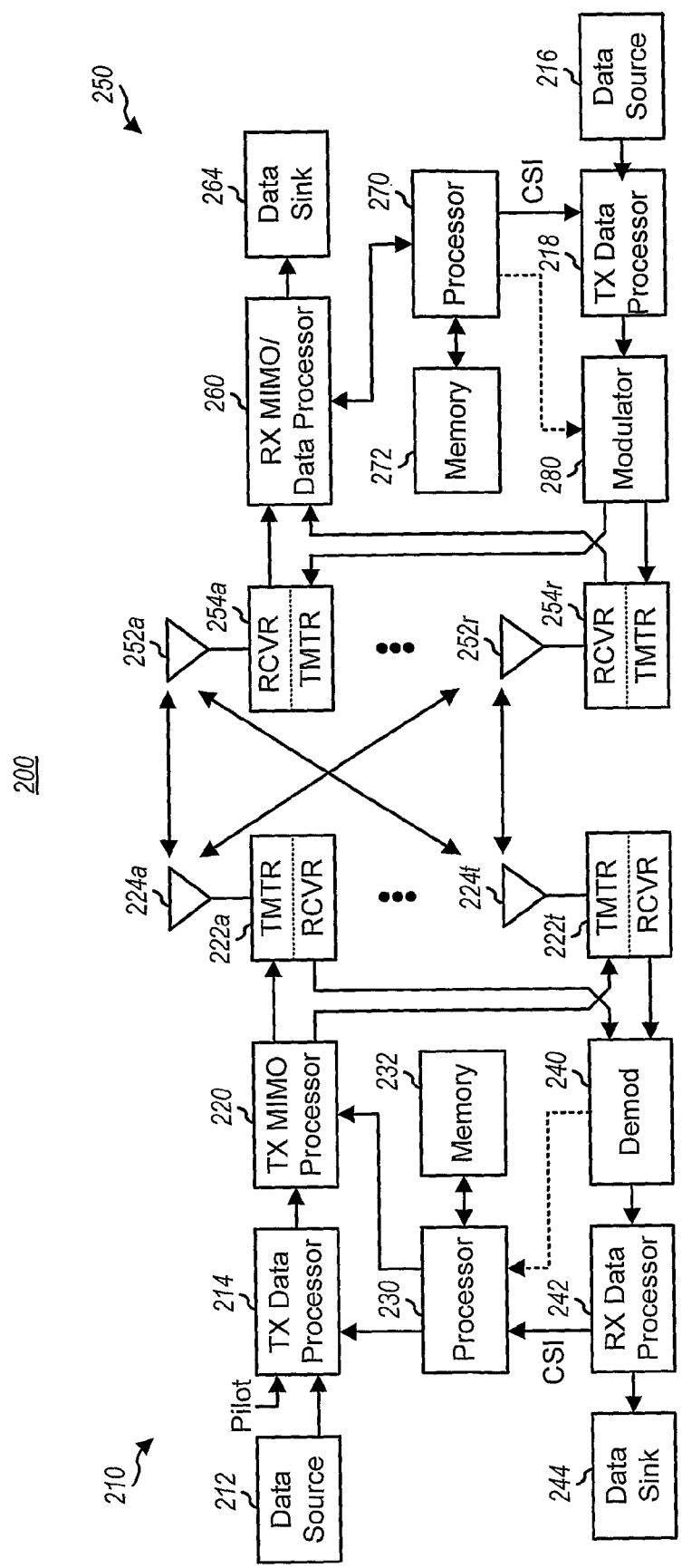
FIG. 2 illustrates embodiments of a transmitter and receiver in a multiple access wireless communication system.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters. (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other embodiments, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. RX data processor 242 can be coupled to a data sink 244. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 3A:
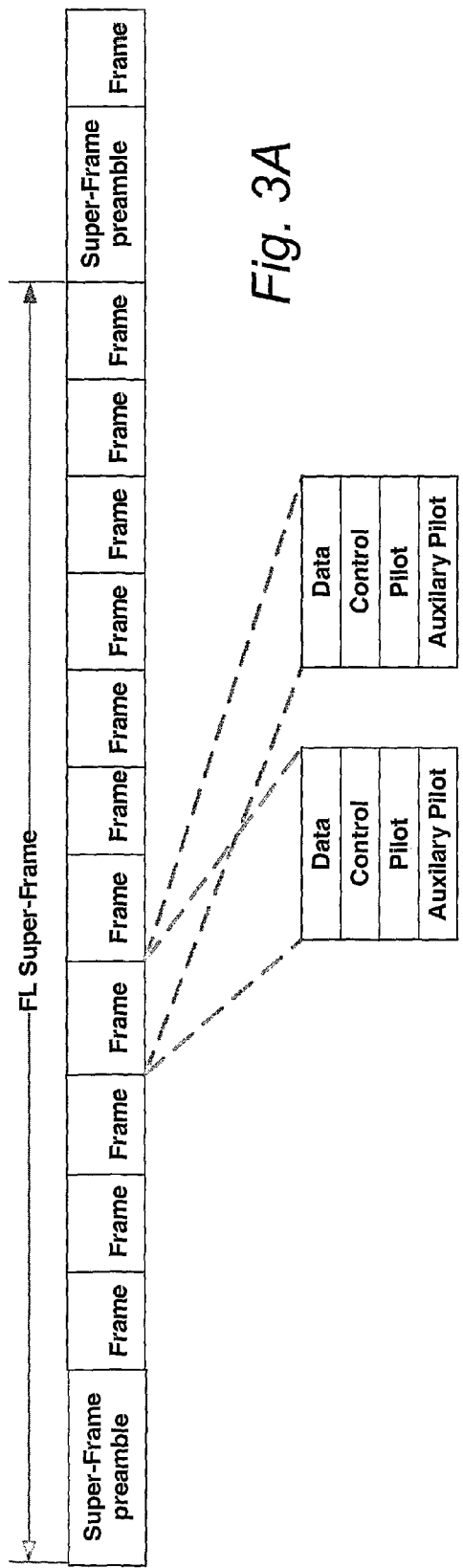
FIGS. 3A and 3B illustrate embodiments of superframe structures for a multiple access wireless communication system.
Figure 3B:
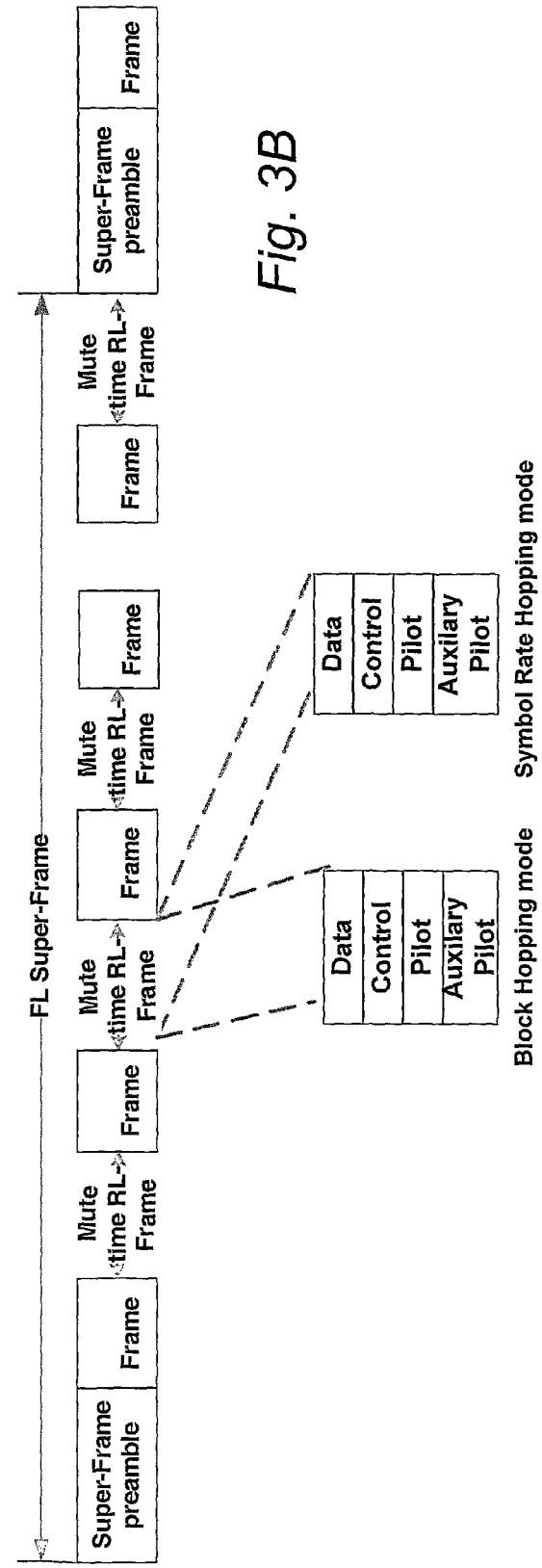

Referring to FIGS. 3A and 3B, embodiments of superframe structures for a multiple access wireless communication system are illustrated. FIG. 3A illustrates embodiments of superframe structures for a frequency division duplexed (FDD) multiple access wireless communication system, while FIG. 3B illustrates embodiments of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
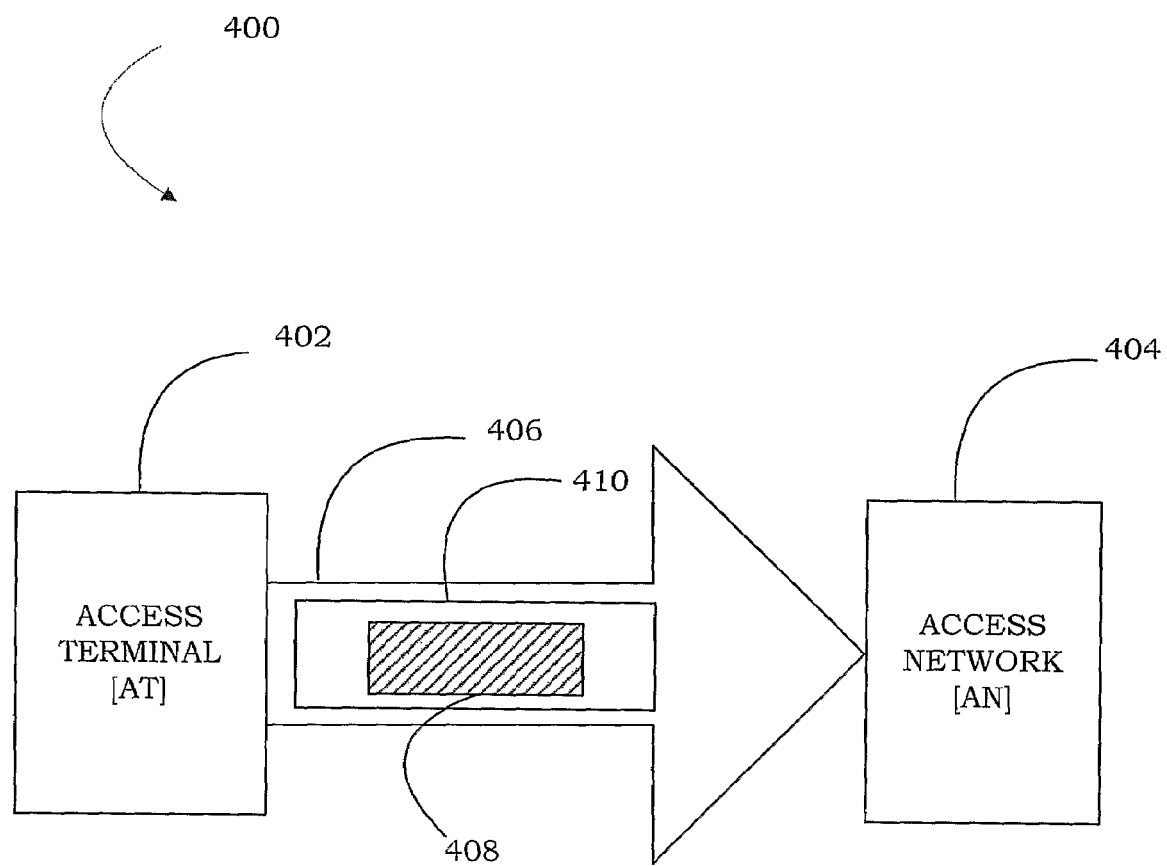
FIG. 4 illustrate embodiment of a communication between an access terminal and an access network.

FIG. 4 illustrates a system 400 showing communication between an access terminal 402 and an access network 404 according to an embodiment. Using a communication link 406 and based upon predetermined timing, system conditions, or other decision criteria, the access terminal 402 will send a SelectedInterlaceAck message to the access network 404 to acknowledge transition to a SelectedInterlacesOff state. The communication link may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (1.times.) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The access network 404 is configured to receive SelectedinterlaceAck message and the access terminal 402 is configured to transmit a SelectedinterlaceAck message 408 to the access network 404 using the communication link 406. The SelectedinterlaceAck message 408 comprises a MessageID field, a PilotPN field, a SelectedInterlaceEnabled field and a Reserved field. In an embodiment, 8 bits may be used for MessageID field, 12 bits may be used for PilotPN field, 1 bit may be used for SelectedInterlaceEnabled field and 3 bits may be used for Reserved field. Generally, a message data structure is used to store the SelectedinterlaceAck message 408 in memory, wherein the data structure is limited to use 8 bits to store the MessageID field, 12 bits to store the PilotPN field, 1 bit to store the SelectedInterlaceEnabled field and 3 bits to store the Reserved field.

The access terminal 402 generates the SelectedinterlaceAck message 408 by setting the values for MessageID field, PilotPN field, SelectedInterlaceEnabled field and Reserved field. For example, the MessageID field is set to "0x04", the PilotPN field is set to the PilotPN of the sector to which the message is directed, the SelectedInterlaceEnabled field is set to "1" to indicate selected interlace mode enabled and to "0" otherwise and the Reserved field is of such length so that the entire message is octet-aligned and is set to "0". The access terminal 402 may incorporate the SelectedinterlaceAck message 408 into a data packet 410. In another embodiment, the SelectedinterlaceAck message 408 may be transmitted without being incorporated into a packet. The data packet comprises header information that indicates whether that data packet 410 contains the SelectedinterlaceAck message 408. The data packet 410 is transmitted on the communication link 406 using one or more channels. In an embodiment, the access terminal 402 may use a channel, of the communication link 406 to transmit the SelectedinterlaceAck message 408.

The access network 404 is configured to receive data packets on the communication link 406, one of which may comprise the SelectedInterlaceAck message 408. Various methods may be used to extract the SelectedinterlaceAck message 408 from the communication link. For example, once the access network 404 has extracted the data packet 410 from one of the channels of the communication link, the access network 404 may check the header information of the data packet 410 to determine if the data packet 410 comprises the SelectedinterlaceAck message 408. If so, then the access network 404 extracts the designated 8 for MessageID field, 12 bits for PilotPN field, 1 bit for SelectedInterlaceEnabled field and 3 bits for Reserved field and stores the values in memory 232.

Figure 5A:
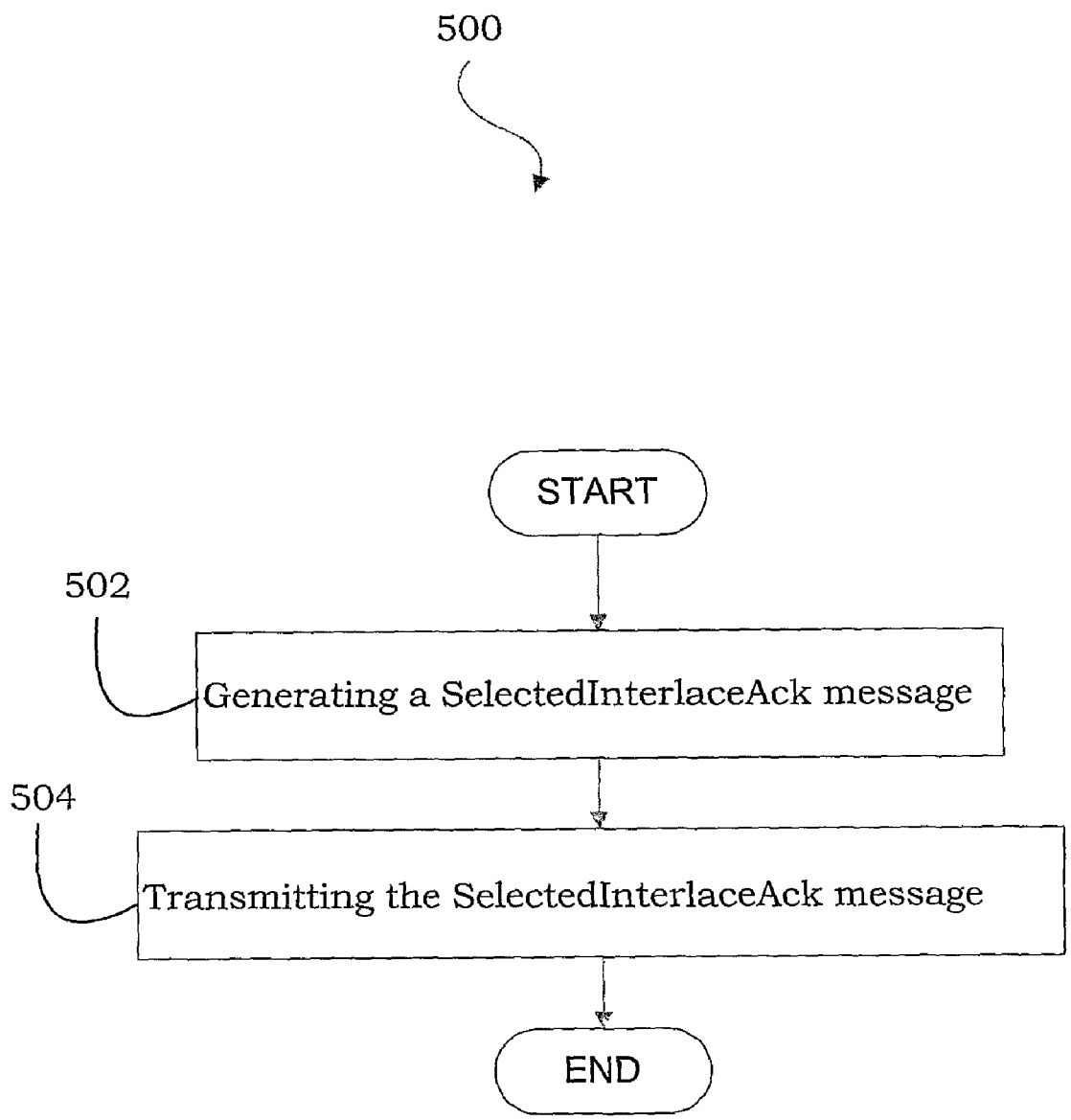
FIG. 5A illustrates a flow diagram of a process used by access terminal.

FIG. 5A illustrates a flow diagram of process 500 for acknowledging transition to SelectedInterlacesOff state, according to an embodiment. At 502, a SelectedInterlaceAck message is generated comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0". At 504, the SelectedInterlaceAck message is transmitted over a communication link.

Figure 5B:
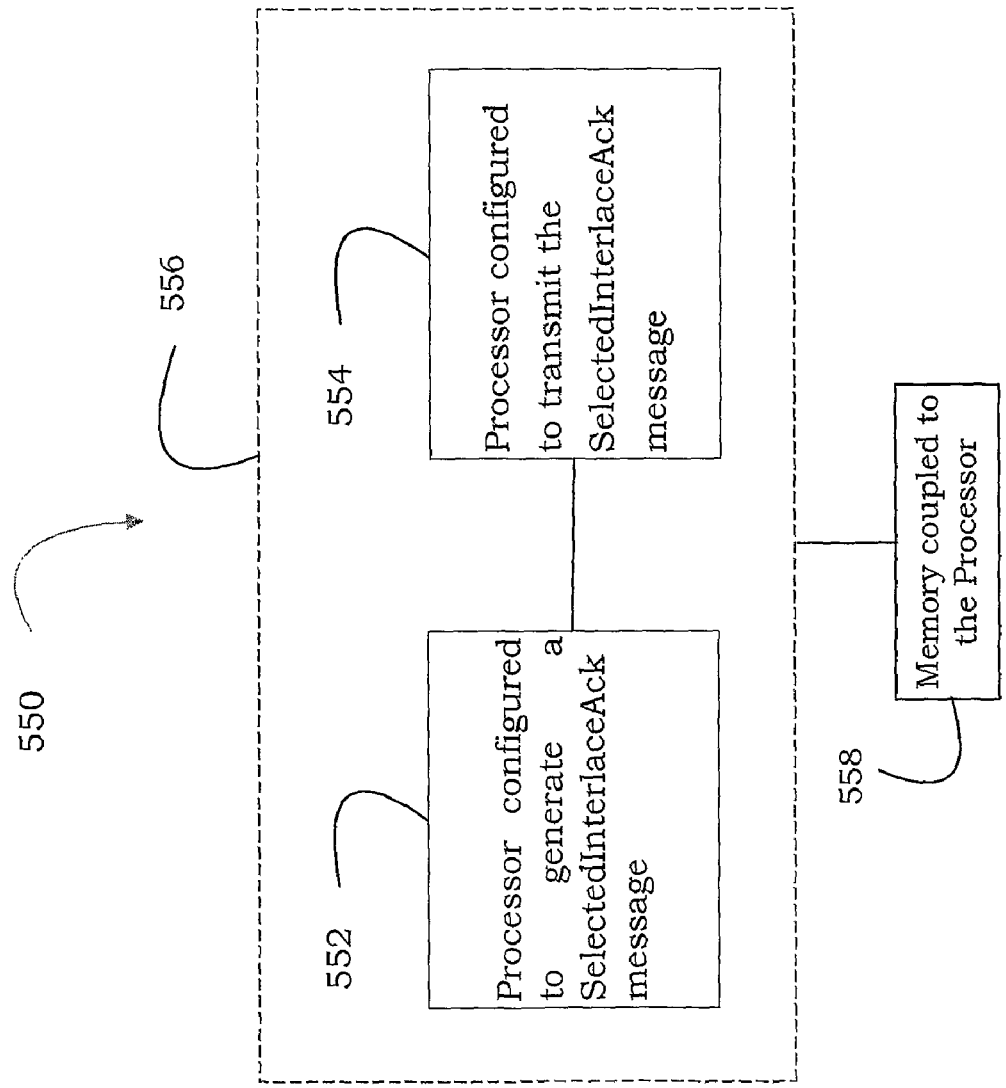
FIG. 5B illustrates one or more processors configured for acknowledging transition to SelectedInterlacesOff state in a wireless communication system.

FIG. 5B illustrates processor 550 for generating and transmitting a SelectedInterlaceAck message. Processor 552 is configured to generate a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0". Processor 554 is configured to transmit the SelectedInterlaceAck message over a communication link. The processor referred to may be electronic devices and may comprise one or more processors configured to transmit the SelectedInterlaceAck message. The functionality of the discrete processors 552 to 554 depicted in the figure may be combined into a single processor 556. A memory 558 is also coupled to the processor 556.

In an embodiment, an apparatus comprises means for generating a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0". The apparatus further comprises means for transmitting SelectedInterlaceAck message over a communication link. The means described herein may comprise one or more processors.

Figure 6A:
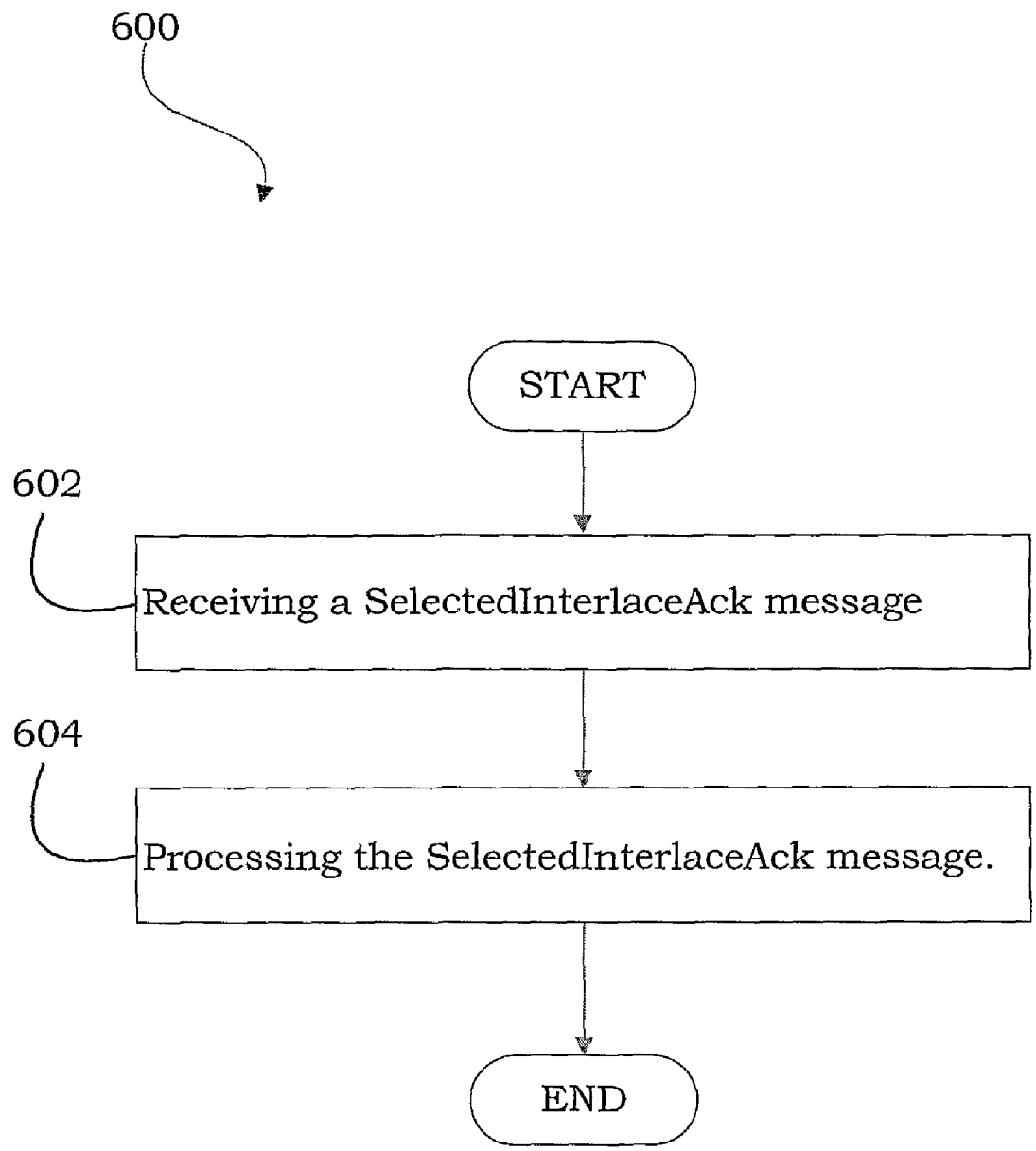
FIG. 6A illustrates a flow diagram of a process used by access network.

FIG. 6A illustrates a flow diagram of process 600 for receiving information in a wireless communication system. At 602, a SelectedInterlaceAck message is received comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and at 604, the SelectedInterlaceAck message is processed.

Figure 6B:
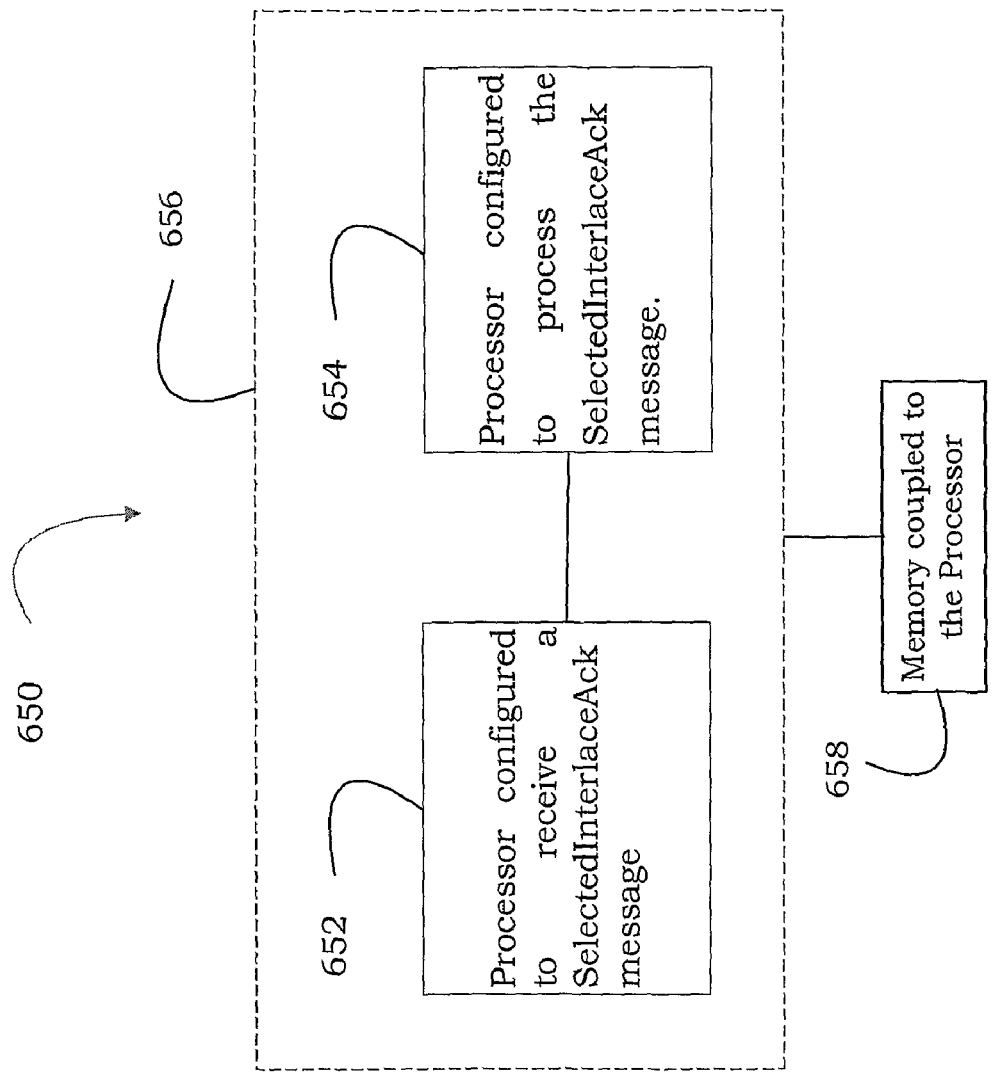
FIG. 6B illustrates one or more processors configured for receiving information in a wireless communication system.

FIG. 6B illustrates processor 650 for receiving and processing SelectedInterlaceAck message. Processor 652 is configured to receive a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0" and processor 654 is configured to process the SelectedInterlaceAck message. The processor referred to may be electronic devices and may comprise one or more processors configured to receive the SelectedInterlaceAck message. The functionality of the discrete processors 652 to 654 depicted in the figure may be combined into a single processor 656. A memory 658 is also coupled to the processor 656.

In an embodiment, an apparatus comprises means for receiving a SelectedInterlaceAck message comprising an 8 bit MessageID field, a 12 bit PilotPN field wherein the PilotPN field is set to the PilotPN of the sector to which the message is directed, an 1 bit SelectedInterlaceEnabled field wherein the SelectedInterlaceEnabled field is set to "1" to indicate selected interlace mode enabled and to "0" otherwise and a 3 bit Reserved field wherein the Reserved field is of such length so that the entire message is octet-aligned and is set to "0". The apparatus further comprises means for processing the received SelectedInterlaceAck message. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various modifications to these embodiments will be readily apparent to those skilled in the art, and the generic principles defined herein may be applied to other embodiments. Thus, the description is not intended to be limited to the embodiments shown herein but is to be accorded the widest scope consistent with the principles and novel features disclosed herein.

We claim:

1. A method of acknowledging transition to a SelectedInterlacesOff state in a wireless communication system, comprising using a processor coupled to a memory to perform the following operations:

generating a SelectedInterlaceAck message, associated with transmission of SSCH (Shared Signaling Channel) blocks from an access network to an access terminal, comprising an 8 bit MessageID field, a 12 bit PilotPN field wherein the PilotPN field is set to a PilotPN of a sector to which the message is directed and an 1 bit SelectedInterlaceEnabled field wherein the SelectedInterlaceEnabled field is set to "1" to indicate selected interlace mode enabled and to "0" otherwise; and transmitting the SelectedInterlaceAck message over a communication link.

2. An apparatus operable in a wireless communication system, comprising at least one processor coupled to at least one machine-readable storage medium storing instructions executable by the at least one processor to implement:

means for generating a SelectedInterlaceAck message, associated with transmission of SSCH (Shared Signaling Channel) blocks from an access network to an access terminal, comprising an 8 bit MessageID field, a 12 bit PilotPN field wherein the PilotPN field is set to a PilotPN of a sector to which the message is directed and an 1 bit SelectedInterlaceEnabled field wherein the SelectedInterlaceEnabled field is set to "1" to indicate selected interlace mode enabled and to "0" otherwise; and transmitting the SelectedInterlaceAck message over a communication link.

3. A computer-readable storage medium tangibly embodying instructions, the instructions if executed by a processor performing a method comprising:

generating a SelectedInterlaceAck message, associated with transmission of SSCH (Shared Signaling Channel) blocks from an access network to an access terminal, comprising an 8 bit MessageID field, a 12 bit PilotPN field wherein a PilotPN field is set to a PilotPN of the sector to which the message is directed and an 1 bit SelectedInterlaceEnabled field wherein the SelectedInterlaceEnabled field is set to "1" to indicate selected interlace mode enabled and to "0" otherwise; and transmitting the SelectedInterlaceAck message over a communication link.

4. A method of receiving information in a wireless communication system, comprising using a processor coupled to a memory to perform the following operations:

receiving a SelectedInterlaceAck message, associated with transmission of SSCH (Shared Signaling Channel) blocks from an access network to an access terminal, comprising an 8 bit MessageID field, a 12 bit PilotPN field wherein the PilotPN field is interpreted as a PilotPN of a sector to which the message is directed and an 1 bit SelectedInterlaceEnabled field wherein the SelectedInterlaceEnabled field is interpreted as "1" to indicate selected interlace mode enabled and to "0" otherwise; and processing the SelectedInterlaceAck message.

5. A computer-readable storage medium tangibly embodying instructions, the instructions if executed by a processor performing a method comprising:

receiving a SelectedInterlaceAck message, associated with transmission of SSCH (Shared Signaling Channel) blocks from an access network to an access terminal, comprising an 8 bit MessageID field, a 12 bit PilotPN field wherein the PilotPN field is interpreted as a PilotPN of a sector to which the message is directed and an 1 bit SelectedInterlaceEnabled field wherein the SelectedInterlaceEnabled field is interpreted as "1" to indicate selected interlace mode enabled and to "0" otherwise; and processing the SelectedInterlaceAck message.

6. An apparatus operable in a wireless communication system, comprising at least one processor coupled to at least one machine-readable storage medium storing instructions executable by the at least one processor to implement:

means for receiving a SelectedInterlaceAck message, associated with transmission of SSCH (Shared Signaling Channel) blocks from an access network to an access terminal, comprising an 8 bit MessageID field, a 12 bit PilotPN field wherein the PilotPN field is interpreted as a PilotPN of a sector to which the message is directed and an 1 bit SelectedInterlaceEnabled field wherein the SelectedInterlaceEnabled field is interpreted as "1" to indicate selected interlace mode enabled and to "0" otherwise; and means for processing the SelectedInterlaceAck message.

7. The method of claim 1, the generating the SelectedInterlaceAck message further comprising generating a 3 bit Reserved field so that the SelectedInterlaceAck message is octet-aligned.

* * * * *